Figures 10, 11:
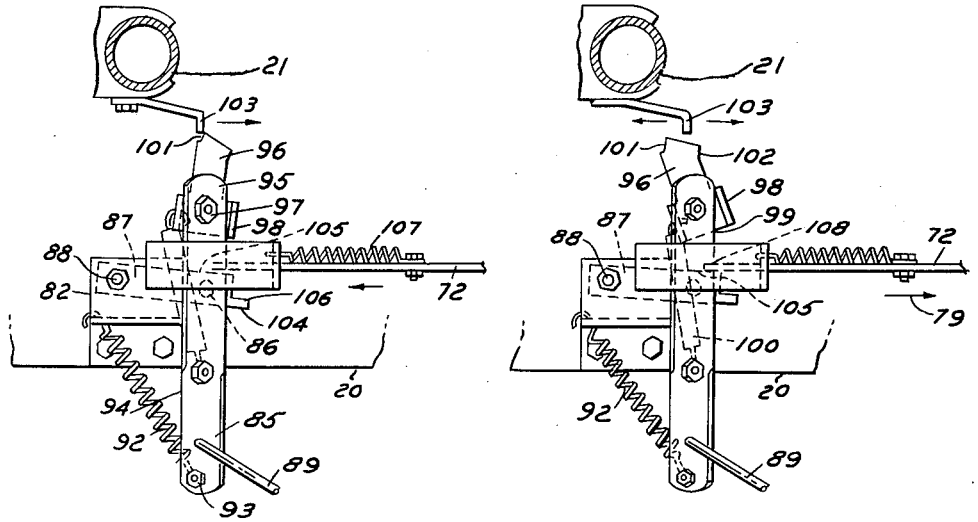

Feb. 8, 1955 V. O. HAUSWIRTH 2,701,517
METERING AND TRIGGER MECHANISM FOR BALE TIERS
Filed May 19, 1951 5 Sheets-Sheet 1
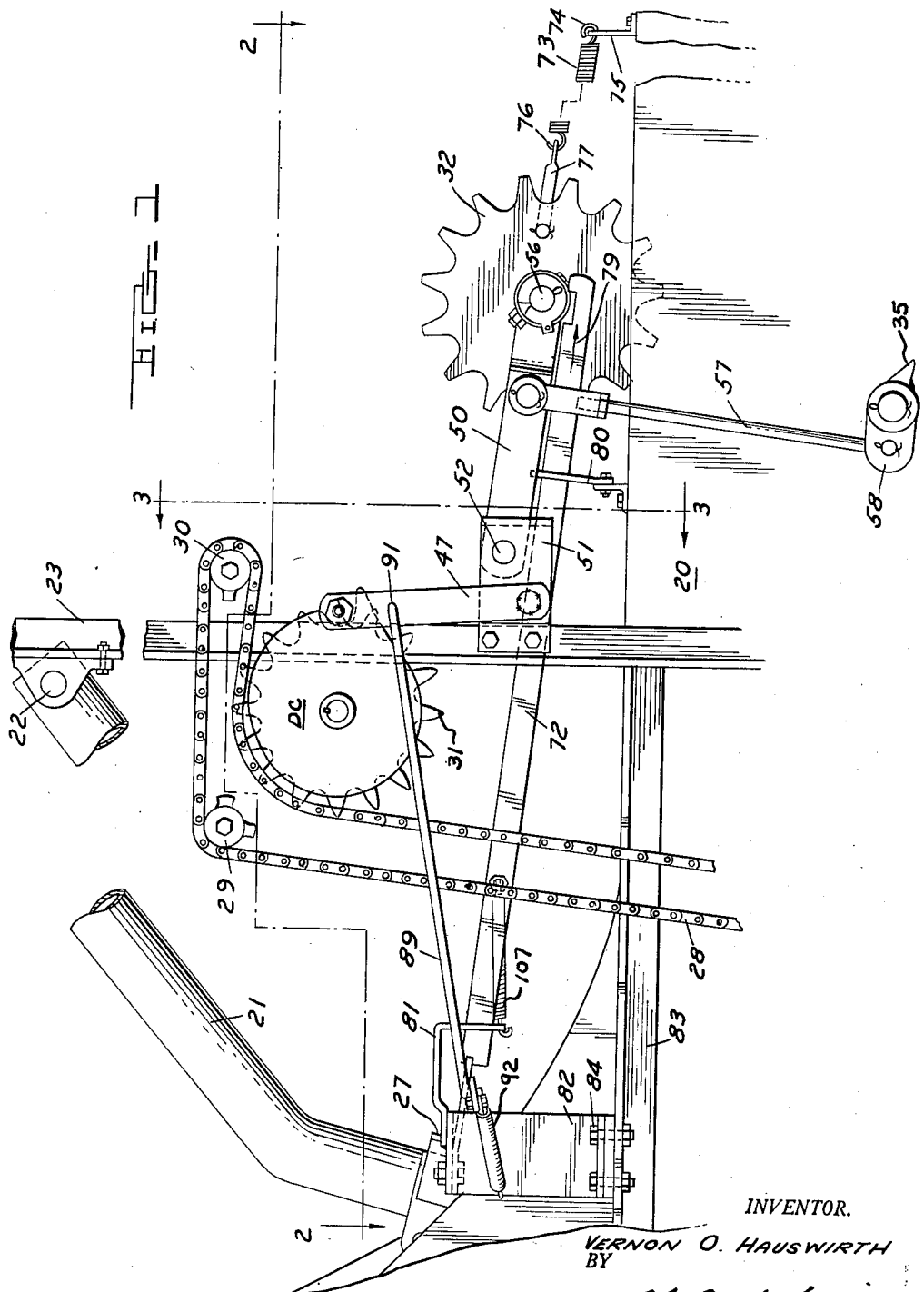
INVENTOR.
VERNON O. HAUSWIRTH
BY
*W. A. Schaich*
ATTORNEY Feb. 8, 1955 V. O. HAUSWIRTH 2,701,517
METERING AND TRIGGER MECHANISM FOR BALE TIERS
Filed May 19, 1951 5 Sheets-Sheet 2
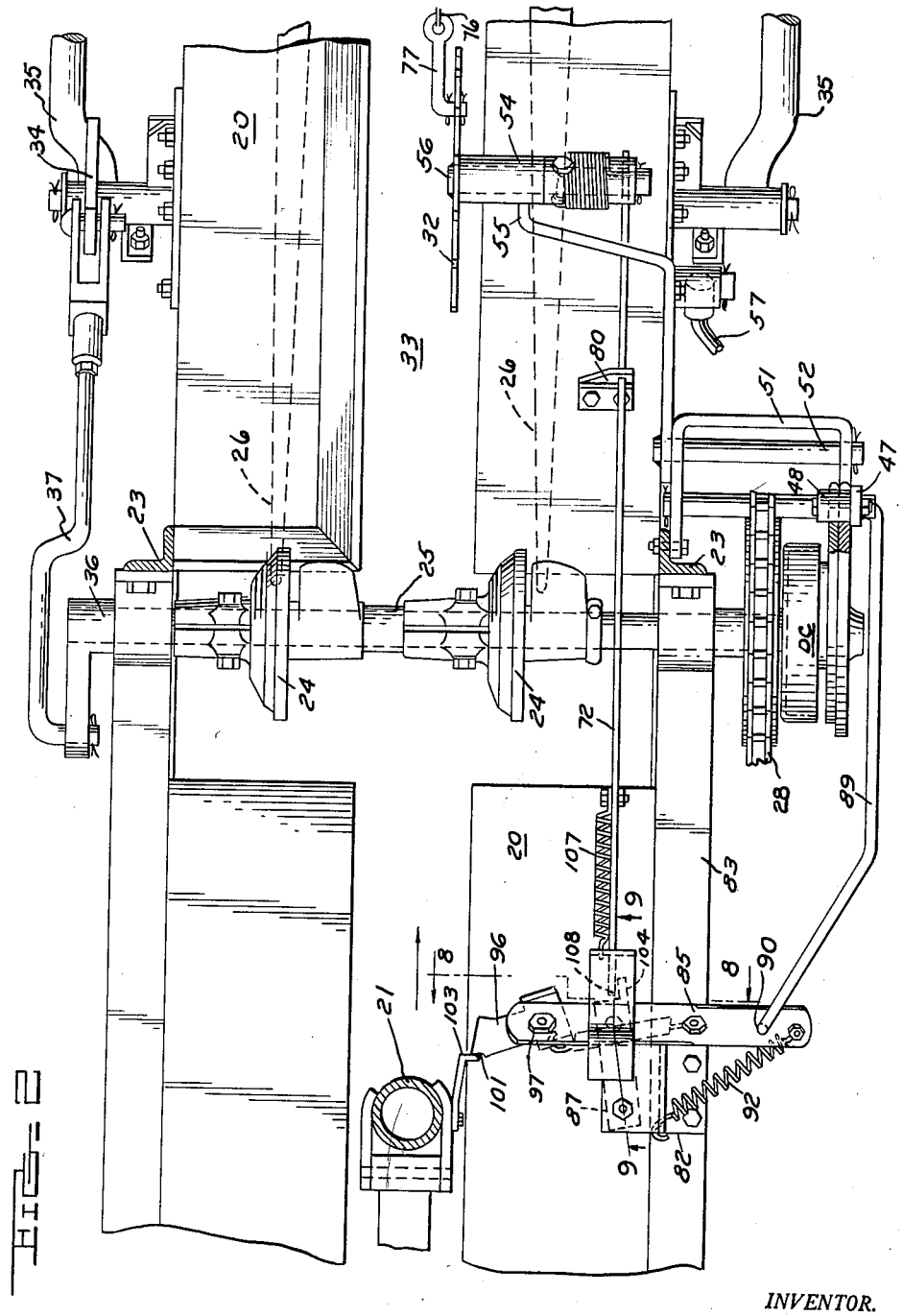
INVENTOR.
VERNON O. HAUSWIRTH
BY
ATTORNEY Feb. 8, 1955  V. O. HAUSWIRTH  2,701,517
METERING AND TRIGGER MECHANISM FOR BALE TIERS
Filed May 19, 1951  5 Sheets-Sheet 3
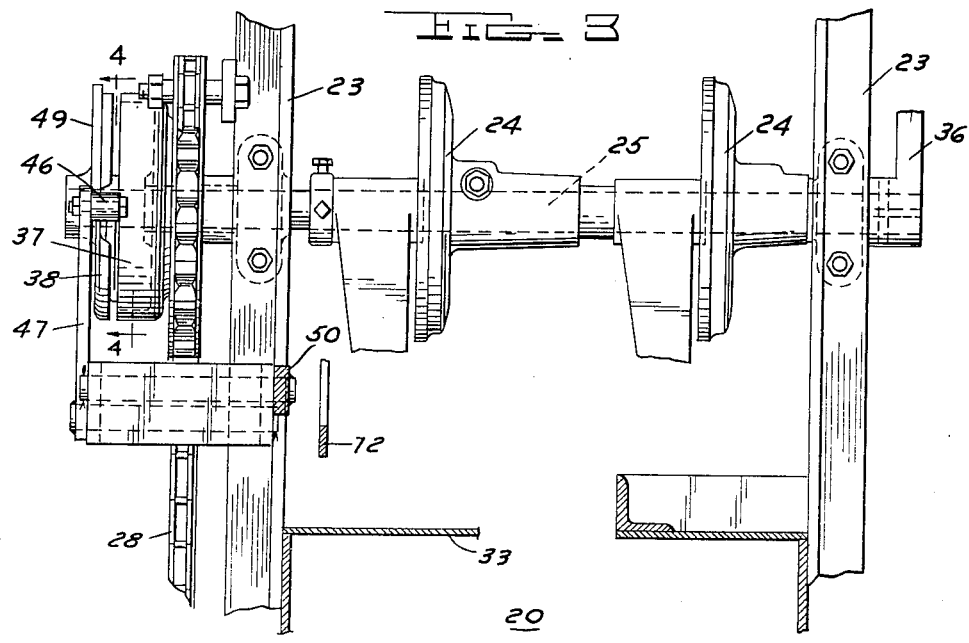
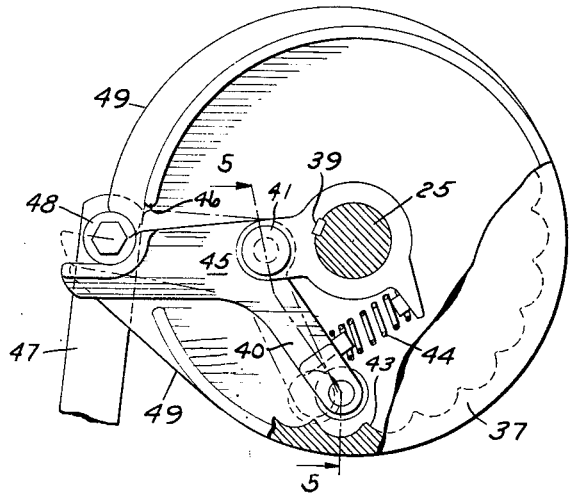
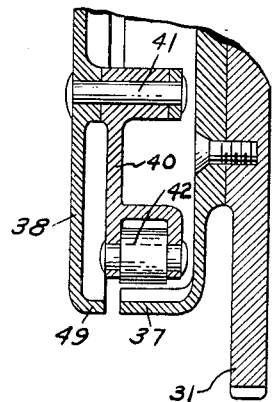
INVENTOR.
VERNON O. HAUSWIRTH
BY
ATTORNEY

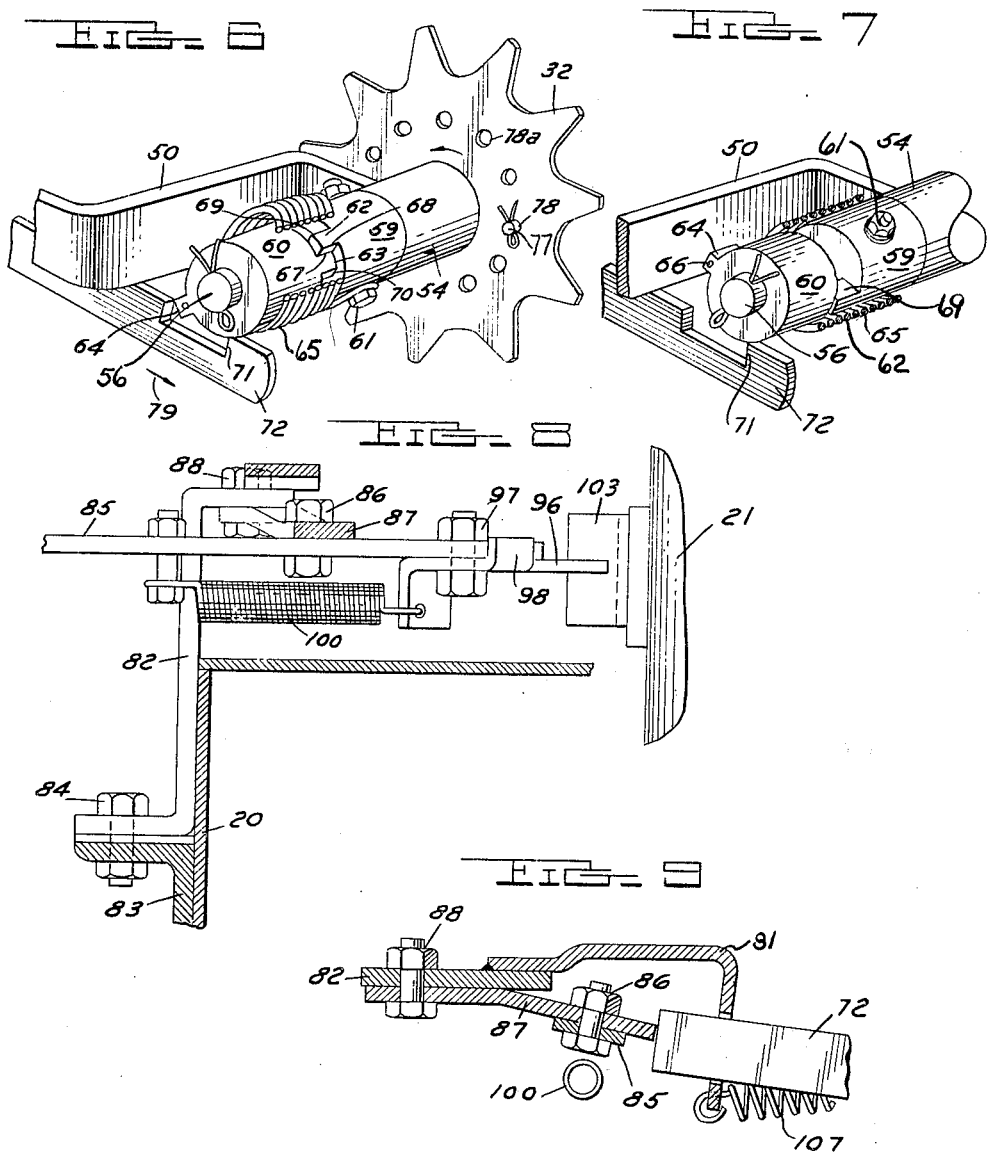

Feb. 8, 1955 V. O. HAUSWIRTH 2,701,517
METERING AND TRIGGER MECHANISM FOR BALE TIERS
Filed May 19, 1951 5 Sheets-Sheet 5

INVENTOR.
VERNON O. HAUSWIRTH
BY
ATTORNEY

United States Patent Office 2,701,517
Patented Feb. 8, 1955

2,701,517

METERING AND TRIGGER MECHANISM FOR BALE TIERS

Vernon O. Hauswirth, Royal Oak, Mich., assignor, by mesne assignments, to Ford Motor Company, Dearborn, Mich., a corporation of Delaware Application May 19, 1951, Serial No. 227,260

5 Claims. (Cl. 100—4)

This invention relates to an improved construction of a device for metering the length of the bale formed in a hay baling machine and to the employment of this device in combination with an improved mechanism for actuating the bale tying cycle.

Briefly, these improvements consist in the provision of a metering device capable of measuring the formation of bales of varying length; in the provision of a triggering mechanism for initiating the operation of the bale tying cycle after a bale of the desired length has been formed; and in the provision of improved means for resetting the triggering mechanism and zeroing the metering device after the bale tying cycle has begun.

The invention is employed in a hay baling machine having as essential elements a bale forming and compressing chamber, a ram movable into and out of such chamber for feeding a charge of material therein, and a mechanism for binding the bales of material formed in the chamber, which mechanism includes needles for feeding twine or other suitable binding means around the bale and knotters for securing the ends thereof together. The needles and knotters operate in a tying cycle which is initiated by the release of a dog-type clutch. These various parts of the baling machine are all common to machines of this type.

It is also a common practice to control the release of the dog clutch and thus initiate the tying cycle by the operation of some metering device whose movement is a function of the length of bale formed in the baling chamber. A wheel, mounted in the machine so that its periphery projects into the baling chamber and is contacted by material being advanced therethrough by operation of the ram, has frequently been employed as a metering device. In the usual instance, after sufficient material has moved past the metering wheel to produce one revolution thereof, a dog rotating with the wheel actuates some suitable mechanism which trips the dog clutch to initiate the tying cycle. Due to the varying conditions encountered in the operation of baling machines, it is generally recognized as being desirable that the metering device used be one whose movement can be controlled so as to produce bales of varying length according to the desire of the operator.

As a safety precaution, it has also been recognized as desirable that a second triggering device for the dog clutch be employed in conjunction with the metering wheel so that release of the clutch and initiation of the tying cycle can only occur when the ram is moving away from the baling chamber on its return stroke, rather than toward the baling chamber on its charging stroke. This additional triggering mechanism is necessary due to the fact that in most baling machines the bale tying needles must move across the baling chamber and thus into the path of travel of the ram in order to bring the twine or wire around the bale and into a position where the twine or wire can be engaged by the knotters.

The relationship of these various elements which comprise part of the setting for the present invention may perhaps be better appreciated from a consideration of Figs. 1 and 2 of the accompanying drawings, Fig. 1 being a side elevation of a portion of a baling machine and Fig. 2 being a plan view thereof along the line 2—2 of Fig. 1. This structure includes part of the baling chamber 20, a ram 21 pivoted at 22 on a frame member 23 extending above the chamber 20, a pair of knotters 24 mounted on a shaft 25 extending transversely of the machine above the mouth of the baling chamber 20, and a pair of curved needles 26 which are located below the baling chamber and are driven through a suitable connecting linkage by rotation of the shaft 25. The ram 21 is actuated by means (not shown) as to oscillate about its pivot point 22 with its charging stroke terminating at a point where the head or pressure plate 27 of the ram is approximately beneath the location of the pivot point and in the mouth of the baling chamber 20. The knotter shaft 25 is driven by movement of a chain 28 which passes over a pair of idler sprockets 29 and 30 and around the periphery of the driving gear 31 of a dog clutch DC, the chain 28 and driving gear 31 being constantly driven. A serrated metering wheel 32 is mounted above and projects into the baling chamber through a slot 33 formed in the top thereof so that the wheel will be rotated by the passage of material through the chamber.

Figure 12:
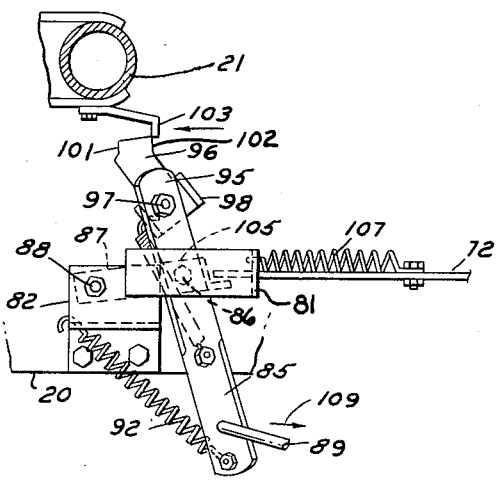

The remaining views of the drawing comprise: Fig. 3—an enlarged end elevation taken along the line 3—3 of Fig. 1 to show the mounting of the knotters and dog clutch; Fig. 4—an enlarged view of the dog clutch taken along the line 4—4 of Fig. 3; Fig. 5—a cross sectional detail of the dog clutch taken along the line 5—5 of Fig. 4; Fig. 6—a perspective view of the metering wheel assembly showing the relationship of the parts in one of the zero or reset positions of the wheel; Fig. 7— a perspective view of a portion of the structure of Fig. 6 showing the relationship of the parts in one of the alternative zero positions of the wheel; Fig. 8—an elevation of the ram actuated triggering mechanism taken along the line 8—8 of Fig. 2; Fig. 9—a detailed plan of a portion of the triggering mechanism of Fig. 8 taken along the line 9—9 of Fig. 2; and Figs. 10, 11 and 12—plan views of the ram operated triggering mechanism showing the relationship of the parts thereof during the resetting movement (Fig. 10), while at rest or in what may be termed "normal position" (Fig. 11), and during tripping movement (Fig. 12).

With the exception of the triggering device itself, all the parts which comprise the tying mechanism of the machine are driven by rotation of the shaft 25, the knotters 24 by direct engagement with this shaft, and the needles 26 by the interconnection, through a link 37, of a crank 34 on their pivotally mounted supporting yoke 35 with a crank 36 secured to one end of the shaft 25. Thus, the entire operation of the baling cycle is dependent upon rotation of shaft 25 which in turn is controlled entirely through the medium of the dog clutch.

The drum 37 of this clutch (Figs. 4 and 5) is secured to the constantly rotating clutch driving gear 31, freely mounted on shaft 25, while the clutch plate 38 is secured to the shaft 25 by a key 39. A clutch dog 40 is pivotally carried by the clutch plate 38 upon a pin 41 and its driving roller 42 is urged toward engagement with the serrated inner face 43 of the drum 37 by a compression spring 44, with the release arm 45 of the dog projecting through a slot 46 in the drum and being normally engaged by a clutch release lever 47. When this release lever is moved out of engagement with the clutch release arm 45, the compression spring 44 urges the driving roller 42 into engagement with the constantly rotating clutch drum to obtain a driving connection between the clutch drive gear 31 and the shaft 25. As will be brought out in subsequent description, the clutch release lever 47 is normally urged into engagement with the clutch release arm 45 and upon disengagement therewith, the roller 48, carried by the lever 47, rides on the cam-shaped periphery 49 of the clutch plate which acts to bring the roller back into engagement with the release arm 45 after the clutch plate, and hence the shaft 25, is turned through one revolution. Operation of all the elements of the tying mechanism is completed during this one revolution of the knotter shaft 25 and hence control of the entire tying cycle is accomplished by moving the clutch release lever from a position of engagement with the clutch release arm to a position of disengagement therewith.

The mechanism of the present invention controls this movement, first as a function of the length of bale formed in the baling chamber through the operation of a metering wheel and, secondly, as a function of the position of the ram 21 through the operation of a triggering mechanism or safety interlock capable of producing disengaging movement of the clutch release lever only when the ram is on its return stroke.

*Metering wheel assembly*

Referring first to Figs. 1 and 2, the metering wheel assembly is carried by a supporting arm 50 having one end pivotally secured to a bracket 51 by a pin 52, bracket 51 being fixed to the frame member 23 of the machine. A bearing 54 is carried by the free end 55 of the arm 50 and this bearing 54 acts as a journal for the shaft 56 to which the toothed metering wheel 32 is secured. The wheel support arm 50 is interconnected by a link 57 to a crank 58 which in turn is secured to the needle supporting yoke 35. Through this interconnection, the metering wheel supporting arm 50 is moved upwardly during the tying cycle to raise the wheel 32 out of the slot 33 in the baling chamber, disengaging it from the material therein.

In addition to the metering wheel 32, a driving collar 59 and a driven collar 60 are carried by the wheel supporting shaft 56, driving collar 59 being attached to the shaft by a bolt 61, while the driven collar 60 is freely rotatable upon the shaft. A driving dog 62 is formed on one face of the collar 59 while a similar driven dog 63 is formed on the adjacent face of the collar 60. Collar 60 also carries a latch dog 64 and is interconnected with the driving collar 59 by a helical spring 65 having one end secured in a hole 66 formed in the latch dog 64 and its other end fastened to the bolt 61.

In Figs. 6 and 7 the parts are shown in their zero or reset position which occurs during the tying cycle after the metering wheel 32 has been lifted out of engagement with the material in the baling chamber by the operation of the connecting link 57 and crank 58 previously described. In this position, the driven collar 60 has been rotated by the helical spring 65 to a position where the return face 67 of its dog 63 is in engagement with the return face 68 of the driving dog 62.

Resetting movement of the metering wheel 32 is accomplished through a spring 73 having one end 74 connected to a bracket 75 carried by the framework of the machine and its other end 76 secured to a hook 77 which is engageable in any selected one of a number of circumferentially spaced holes 78 formed in the face of the metering wheel 32. The point of engagement between the hook 77 and metering wheel 32 determines the radial position to which the return face 68 of the driving dog 62 is brought during resetting movement. A comparison between Figs. 6 and 7 will illustrate the difference in such radial position obtainable by changing the point of engagement between the hook 77 and metering wheel 32, Fig. 7 illustrating the position obtainable were the hook to be engaged in the hole 78a of the metering wheel rather than in the hole 78 as shown in Fig. 6. Comparing the relative positions of the latch dog 64, Figs. 6 and 7, it can be seen that with the reset position determined by the engagement of hook 77 in the hole 78a the position of latch dog 64 in Fig. 7 has been retarded approximately 45 degrees from that shown in Fig. 6. This means that the metering wheel will have to revolve this additional amount before initiating the bale tying operation, hence a longer bale is formed, as well be more clearly appreciated from the following description of the operation of the metering wheel assembly during its metering function.

After the tying cycle has been completed and the metering wheel 32 has again been lowered through the slot 33 in the baling chamber 20, the passage of further material therethrough will produce rotation of the metering wheel 32, and driving collar 59 in a counterclockwise direction as the parts are viewed in Figs. 6 and 7. This rotation will be initially accompanied by rotation of the driven collar 60 until the latch dog 64 strikes the notch 71. The driven collar 60 will then idle on the shaft 56 until the driving face 69 of the driving dog 62 comes into contact with the driven face 70 of the dog 63. Further rotation of the wheel 32 is then accompanied by movement of the latch bar 72, which up to this point, has been held against movement resulting from the tension created in spring 65, by other spring means to be presently described.

Latch bar 72 forms an interconnecting member between the metering wheel assembly and the triggering mechanism so that the latter mechanism is not placed in tripping position until the latch bar has been engaged by the latch dog 64 and moved in the direction of the arrow 79 (Figs. 1 and 6). Guiding this movement are two latch bar supporting brackets (Figs. 1 and 2), one 80 carried by the frame of the machine adjacent the metering wheel assembly, and a second 81, attached to the bracket 82 which supports the triggering mechanism.

*Triggering mechanism*

The bracket 82 which supports the triggering mechanism is a Z-shaped member attached to a frame side rail 83 by bolts 84 at a point in advance of the mouth of the baling chamber 20. The triggering mechanism itself is best shown in Figs. 8–12 and consists of a trip lever 85 pivotally attached at 86 to a supporting arm 87 which in turn is pivotally connected to the bracket 82 by a bolt 88. A clutch release link 89 (Figs. 1 and 2) is connected between a point 90 on the trip lever 85 and a point 91 on the clutch release arm 47. A return spring 92 is connected between the supporting bracket 82 and the outer end 93 of the lever 85 and acts to impart a double movement to the lever—first, a return movement in a clockwise direction as the parts are viewed in plan (Figs. 10–12), which movement is retricted when the side 94 of the lever abuts against the face of the supporting bracket 82, and second, a counterclockwise movement of the lever supporting arm 87 about its point 88 of pivotal attachment to the supporting bracket 82.

The trip lever 85 normally extends substantially transversely of the machine, its inner end 95 being directed towards the path of travel of the ram 21. An extension member 96 is pivotally secured to the end 95 of the lever by a bolt 97, member 96 being provided with an upturned flange 98 which overlies one side 99 of the trip lever 85. The flange 98 is spaced from the side 99 of the lever so as to allow limited rocking movement of the extension member 96, this movement being controlled by a return spring 100 which acts to normally bring the extension member to the position shown in Fig. 11. The end of the extension member 96 is formed with a cam surface 101 and a latch surface 102, each of which surfaces is adapted to be contacted by a trip plate 103 carried by the ram 21, contact between the trip plate and cam surface 101 occurring on a charging stroke of the ram, while contact between the trip plate and latch surface 102 occurs on a return stroke.

The trip lever supporting arm 87 extends beyond its point 86 of pivotal connection with the lever and this extension portion is provided with a projecting stop 104. The inner surface 105 of the supporting arm 87 and the inner surface 106 of its projecting stop are each adapted to be contacted by the latch bar 72 which is normally urged by a spring 107 into a position of engagement with either of these surfaces. When the parts are at rest or in normal position, as shown in Fig. 11, the end 108 of the latch bar 72 is in contact with the inner surface 105 of the trip lever supporting arm 87.

After the metering wheel has performed its metering function, as previously described, to move the latch bar 72 in the direction of the arrow 79, the end 108 of the latch bar will move out of engagement with the surface 105 of the trip lever supporting arm, allowing the supporting arm to rotate about its pivotal connection 88 under the influence of the spring 92 and moving the trip lever 85 and its extension lever 96 inwardly into the path of travel of the trip plate 103 carried by the ram. This movement is restricted by the engagement of the end 108 of the latch bar with the surface 106 of the stop 104 and the parts will occupy the position shown in Fig. 2. If the ram 21 happens to be on its charging stroke when the parts are in this position, the trip plate 103 will contact the cam surface 101 of the extension member 96 as it passes the triggering mechanism, which contact will first cause a pivotal movement of the extension member 96 to the position shown in Fig. 10, followed by a pivotal movement of the supporting arm 87 as the trip plate rides along the cam surface 101. This movement corresponds to the resetting motion of the parts as shown in Fig. 10 with the exception that latch bar 72 will be held by the latch dog 64 and prevented from being moved to its reset position by the return spring 107. Thus, as soon as the ram 21 and trip plate 103 have moved past the extension member 96, the spring 92 will cause the trip lever to move inwardly so that the extension member is again placed in the path of travel of the trip plate. Then, on the return stroke of the ram, the latch surface 102 of the extension member will be contacted, as shown in Fig. 12, and cause a pivoting movement of the trip lever 85 about its pivot point 86, moving the clutch release link in the direction of the arrow 109 and producing clockwise pivoting of the clutch release arm 47 as the parts are viewed in Fig. 1. This disengages the clutch release lever from the clutch release arm and initiates the bailing cycle as previously described.

During the baling cycle, the metering wheel assembly is lifted upwardly from the baling chamber which movement also disengages the latch dog 64 from the notch in the latch bar 72 so that control of movement of the latter is taken over by the return spring 107. On the next charging stroke of the ram, resetting of the triggering mechanism will occur with the end 108 of the latch bar being brought into engagement with the surface 105 of the trip lever supporting arm 87 as the trip plate 103 contacts the cam surface 101 of the extension member 96 to cause the resetting motion previously described.

I claim:

1. A baler having a bale compressing ram, a bale case enclosing a bale compressing chamber, and bale tying means on said case having a cycle of operation controlled by the engagement of a clutch, mechanism for actuating said bale tying cycle in response to—(a) the formation of a bale of preselected length, and (b) the return movement of said bale compressing ram, comprising a trip lever assembly including a trip lever mounted on said bale case for pivoted movement, means normally urging said lever toward a tripping position from a reset position, said lever extending toward said ram and carrying at one extremity a latch surface and a cam surface, said latch surface adapted to be contacted by said ram on the return stroke thereof to produce tripping movement of said lever, said cam surface adapted to be contacted by said ram on the charging stroke thereof to produce resetting movement of said lever, retaining means normally holding said trip lever assembly in reset position at which said surfaces are not contacted by said ram, a metering wheel assembly including a metering wheel mounted on said bale case to project into said bale compressing chamber and be rotated by movement of material therethrough, and an actuating member for operatively connecting said metering wheel to said retaining means and effective to release said retaining means upon a given amount of rotation of said metering wheel from a zero position.

2. A metering wheel assembly including a rotatable metering wheel adapted to initiate movement upon a given amount of rotation of said wheel from a zero position, including a driving dog rotatable with said wheel, said dog having a driving face and a return face, a driven member having a driven dog engageable by said driving dog, means normally urging said driven dog into contact with the return face of said driving dog, an actuating member carried by said driven member, and means for varying the zero position of said driving dog including a yieldable member having one end thereof secured to a stationary member and a plurality of spaced points on said wheel for selectively securing the other end of said yieldable member thereto.

3. A baler having a bale case enclosing a bale compressing chamber and bale tying means including a release latch mechanism, a metering wheel assembly mounted on said bale case including a rotatable metering wheel adapted to project into said bale compressing chamber and be rotated by movement of material therethrough, said metering wheel assembly having an actuating dog engageable with said latch mechanism to initiate tying of a bale thereby upon a given amount of rotation of said wheel from a variable zero position, and means for resetting said wheel to a selected zero position during the operation of said bale tying means comprising a yieldable connection between a fixed point on said bale case and a point on said metering wheel radially spaced from the center of rotation thereof, and means for varying the point of attachment between said yieldable connection and said wheel.

4. A hay baler having a bale case enclosing a bale compressing chamber and bale tying means including a release latch mechanism, a metering wheel assembly mounted on said bale case and including a rotatable metering wheel peripherally projecting into said compressing chamber for rotation upon movement of material therethrough, an actuating dog engageable with said latch mechanism to initiate tying of a bale thereby, a driving connection between said wheel and said dog to effect dog-latch mechanism engagement upon rotation of said wheel from a zero position, said wheel having a plurality of arcuately disposed attachment points spaced radially thereof from the center of wheel rotation, and a retaining element extending from said bale case to a selected one of said attachment points to vary the zero position of said metering wheel.

5. A hay baler having a bale case within which a bale is longitudinally movable during formation thereof and bale tying mechanism including an actuatable trip lever, bale length responsive means comprising a rotatable wheel mounted on said bale case and peripherally engaging said bale during formation thereof to be rotated thereby, a rotatable element mounted on said bale case in juxtaposition to said wheel, a lost motion driving connection between said wheel and said element to interconnect the same, said lost motion connection accommodating initial free rotation of said wheel as a bale is being formed and subsequent corotation of said wheel and said element, said element being effective to actuate said trip lever during rotation of said wheel and said element, and an adjustable positioning mechanism for rotationally indexing the wheel relative to said element, said positioning mechanism including an extensible retaining element having one end fixed to the baler and its other end operatively attachable to said wheel at a selected one of a plurality of spaced portions thereof for rotationally indexing the wheel relative to said element to vary the extent of initial free rotation of said wheel, thereby determining the length of the bale formed prior to actuation of said trip lever.

References Cited in the file of this patent

UNITED STATES PATENTS

| 1,404,447 | Koontz | Jan. 24, 1922 |
| 2,498,319 | Vutz et al. | Feb. 21, 1950 |
| 2,516,742 | Adkisson | July 25, 1950 |
| 2,548,559 | Ronning | Apr. 10, 1951 |
| 2,560,143 | Vietti | July 10, 1951 |

FOREIGN PATENTS

| 274,700 | Germany | May 28, 1914 |